Nov. 21, 1950  B. L. HAVER  2,531,216
ADJUSTING OR CONTROLLING DEVICE
Filed Aug. 2, 1948  2 Sheets-Sheet 2
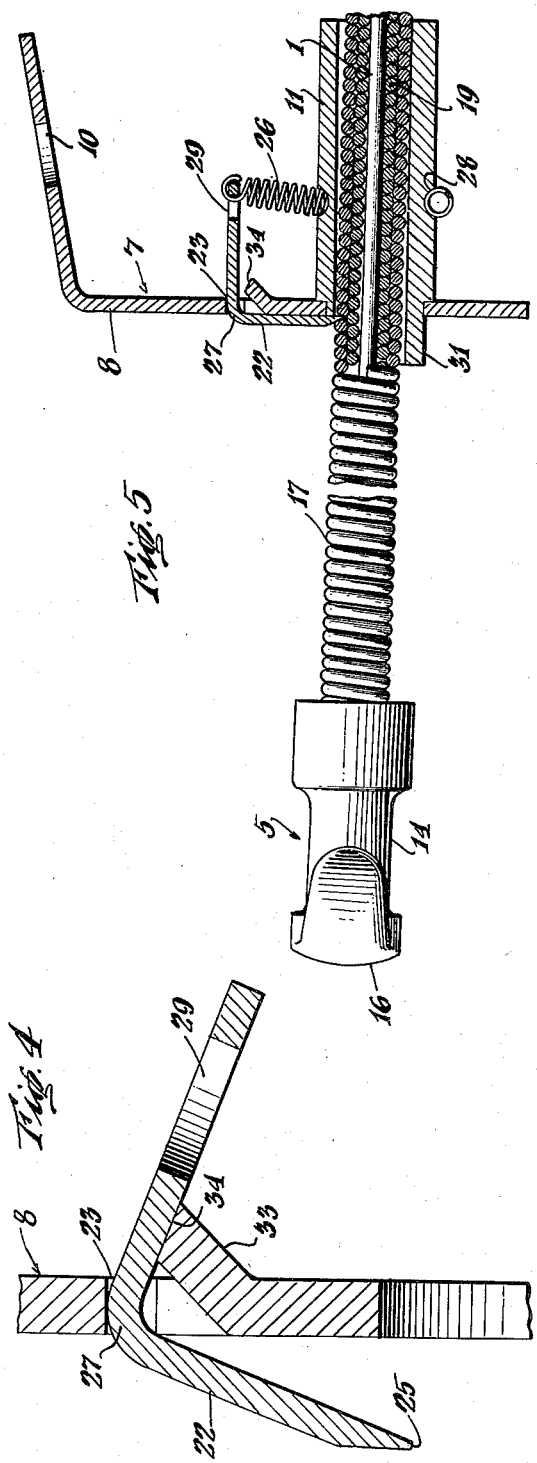
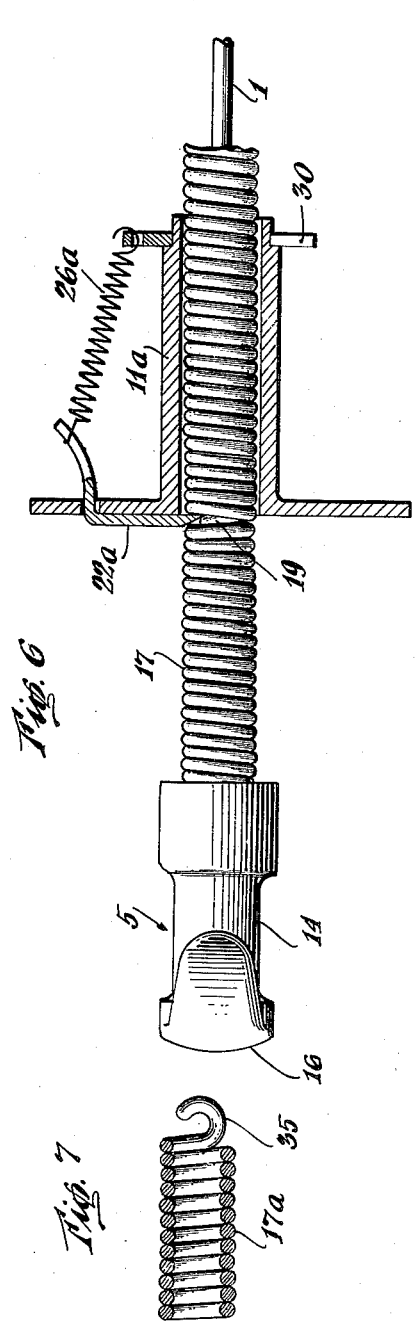
INVENTOR
Burton L. Haver
BY
Norman T. Holland
ATTORNEY Patented Nov. 21, 1950

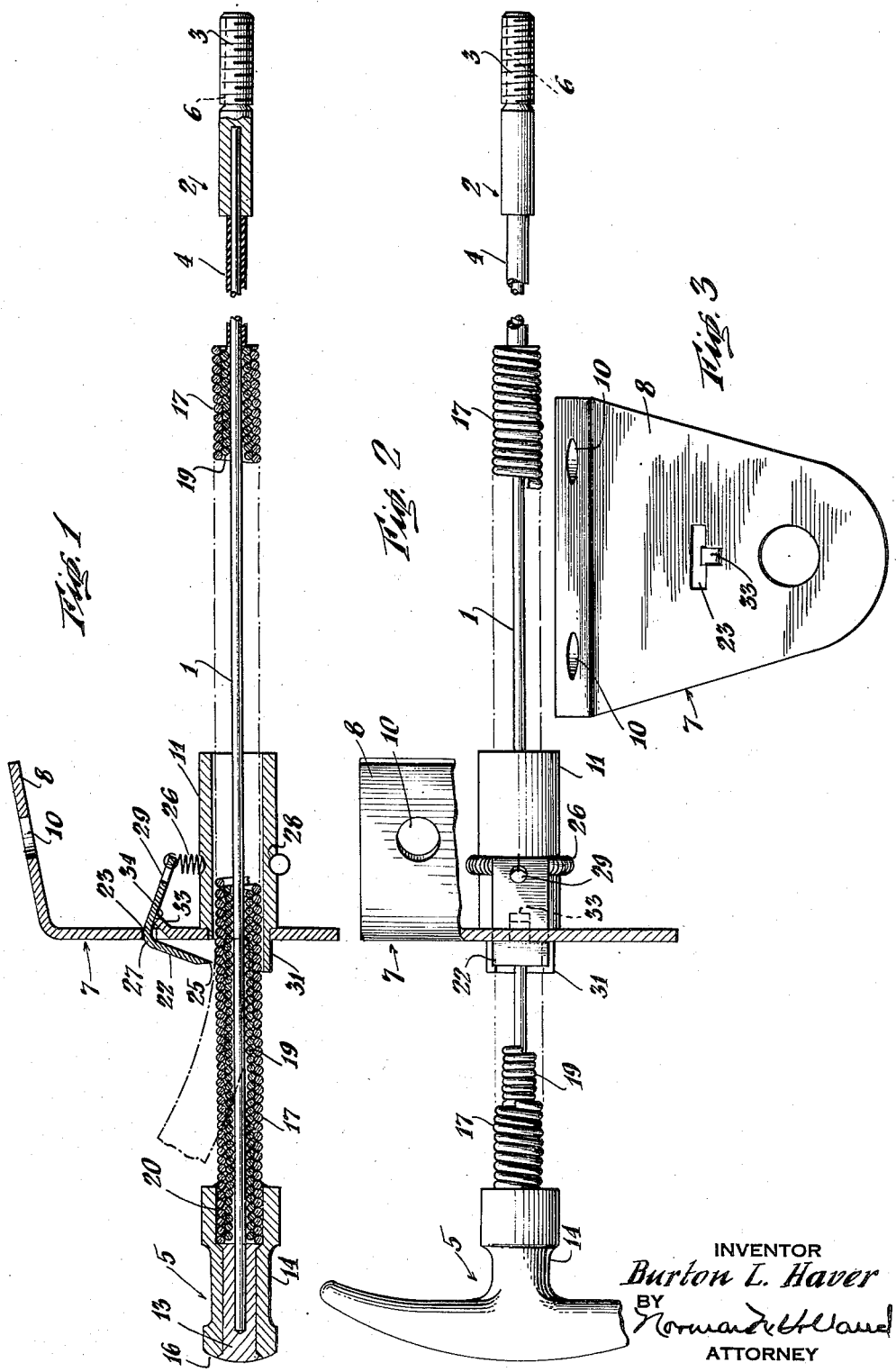

2,531,216

UNITED STATES PATENT OFFICE 2,531,216

ADJUSTING OR CONTROLLING DEVICE

Burton L. Haver, Kingston, N. Y.

Application August 2, 1948, Serial No. 41,912

6 Claims. (Cl. 74—502)

The present invention relates to an adjusting or controlling means, and more particularly to a device which may be utilized for actuating such as automotive vehicle brakes of the hand operated type, or for selectively positioning various other mechanisms.

For purposes of clarity and convenience of description the present device will be described chiefly with reference to its use for adjusting or controlling the braking mechanism of an automobile.

Various constructions have been utilized previous to the present invention for engaging and releasing by hand the "parking" or "emergency" brakes of automobiles. Many of these previous constructions are objectionable for reasons such as excessive bulkiness, high manufacturing costs, lack of simplicity of construction and installation, and difficulties of operation.

The present invention aims to overcome the above and other disadvantages or objections by providing a relatively simple and inexpensive device for effecting engagement and release of such as automobile braking mechanisms, the present device being one which is readily and easily installable and which may be quickly and easily operated by an operator. The invention further contemplates the provision of a new and improved device for operating brake mechanisms which is particularly adaptable to use with small or "bantam" types of automobiles.

An object of the present invention is to provide a new and improved adjusting or controlling device.

Another object of the invention is to provide a new and improved device for engaging and releasing automobile brake mechanisms, and one which is not readily subject to unintentional release.

Another object of the invention is to provide a brake mechanism actuating device of relatively simple construction.

Another object is to provide a device for operating such as automobile parking brake mechanisms which may be more readily and easily operated than the previous constructions.

Still another object of the invention is to provide a brake actuating device which is particularly adaptable for use with small cars.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a longitudinal sectional view showing a preferred embodiment of the present invention;

Fig. 2 is a top plan view of the device illustrated in Fig. 1;

Fig. 3 is a front view of a form of mounting bracket;

Fig. 4 is an enlarged fragmentary sectional view showing a portion of the bracket illustrated in Fig. 3;

Fig. 5 is a fragmentary side view showing parts of the present device in locked or engaged relationship;

Fig. 6 is a view showing a modified detail of means for operating an engaging member; and Fig. 7 is a fragmentary view showing a modified form of the present invention.

Referring more particularly to Figs. 1 and 2 of the drawings there is shown a cable or rod-like member 1, of any convenient length, which may be connected at a free end thereof with a brake mechanism or its actuating levers or rods. The free end of the brake controlling cable 1 may be connected in any suitable manner with the brake mechanism or other members that serve to operate it, for example, a threaded connecting member 2 which grips the end of the cable or rod 1, may be screwed together with the brake jaws or other operating part. The outermost threaded end of the connecting member may be in the form of a collar or sleeve 3 extending around a reduced portion 6 and retained thereon in any appropriate manner so that the cable or rod 1 can be rotated with respect to its attachment end 3. The reason for this construction will be brought out in connection with the operation of the present device. Preferably the cable or rod 1 is provided with a non-conducting or insulating covering 4 to minimize contact with electrical wiring and also to minimize noise in instances where the cable or rod may come into contact with adjacent parts of the automobile.

The opposite end of the control cable or rod 1 is shown provided with a handle 5, the handle being so positioned when installed in a vehicle as to be readily accessible for grasping by the hand of an operator. When the handle 5 is pulled so as to move the rod 1 toward the left (Figs. 1 and 2), the braking surfaces will be moved to engage, the release being obtained by allowing the handle 5 and member 1 to move back toward the right (Figs. 1 and 2). The brake surfaces are usually disengaged or unlocked under normal conditions and the pulling on the handle and rod serves to clamp them against a brake drum surface.

The cable or rod 1 may be connected with the handle 5 in any suitable manner, one convenient method is to attach the end of the cable to an insert or plug member 13, the part 13 extending through the handle proper 14 and being headed over at its outermost end 16 to secure the parts firmly together. A shrink fit, rivets or screws, or any other convenient means may be provided to secure these parts together. While a rod may be used for the controlling member 1 it is preferred to utilize a cable which is more flexible than a rod, as the latter may be readily installed in a vehicle and facilitates operation of the present device, as will be more fully brought out hereinafter.

In Figs. 1 and 2 the handle 5 and controlling cable 1 are shown assembled with a mounting bracket 7, the mounting bracket comprising a plate member 8, provided with suitable openings 10 for facilitating attachment to a dashboard, steering column, or the like, and a sleeve-like member 11 that extends through an opening or aperture in the mounting plate 8 and serves to support and guide the controlling cable or rod 1 and the gripping handle 5 connected thereto.

When the handle 5 and cable 1 are pulled outwardly away from the mounting bracket 7 as above described to effect gripping of the brake mechanism, it is desirable that engaging or locking means be provided for maintaining the gripped relationship until such time as it is desired to release the brake. The locking and releasing of the brake should be performable easily and readily without effort on the part of the operator and the means for achieving this will now be described.

As shown, a laterally movable, and laterally flexible or yieldable, helical spring or helical spring-like adjusting member 17 is connected with the handle portion 5 and extends therefrom along the outer surface of the cable 1 for any suitable distance; preferably this distance is at least in excess of that through which the cable 1 moves during engagement and release of the braking mechanism. In one instance a length of about eight inches for the adjusting member 17 has proven satisfactory. The adjusting member 17 extends through and is supported and guided by the sleeve 11 of the bracket 7. Adjacent turns of the spring-like member 17 fit closely against each other and form a substantially corrugated, ridged, or helical exterior surface which is adapted to cooperate with a locking or retaining member 22 to maintain the parts in a selected position of adjustment. The member 17 is referred to as an "adjusting" member since it may be adjusted or moved to control a mechanism connected with the device.

Preferably an additional helical spring or spring-like member 19 is provided intermediate the control cable 1 and the outer helical-like member 17, the turns of the inner member being in an opposite direction than those of the outer member. While the turns of the inner and outer members 17 and 19 may be of the same hand or direction, the opposite turns are deemed preferable. For example, the outer member may have its turns wound in right hand direction and the inner member may have its turns wound in left hand direction. For purposes of appearance and improved wearing qualities the outer member 17 may be formed from stainless steel spring wire. The inner member 19 assists in supporting the outer member 17 and minimizes deformation thereof in connection with operation of the device. The combination of inner cable 1, inwardly disposed spring-like member 19, and out spring like member 17, provides a construction which may be flexed or bent laterally with respect to the guiding sleeve 11 of the supporting bracket 7, and which quickly returns to an original position upon release of the handle 5.

One end of each of the inner and outer members 17 and 19 is secured to the handle 5 and this may be achieved by extending the ends into a socket portion 20 of the handle stem 14 and firmly fixing them therein in any manner. Opposite ends of the inner and outer members 17 and 19 may be cut off at any suitable length, for example about eight inches as previously mentioned, or they may be fastened together at their ends, or along their lengths, to thereby minimize any sharp or rough edges.

The interior dimension of the sleeve member 11 and the exterior dimension of the outer member 17 are such as to provide a relatively close fit between these two parts, but one which does not interfere with operation or movement of parts with respect to the bracket 7. An interior diameter for the sleeve opening of approximately $27/64$ of an inch and an outer diameter for the outer member 17 of approximately $25/64$ of an inch have been found to give excellent results.

The locking or engaging member 22 which is adapted to cooperate with laterally movable outer member 17 to maintain an adjusted position thereof is shown in Figs. 1, 2 and 4 as substantially L-shaped and extending through an opening 23 in the plate member 8, with its engaging or locking end 25 adjacent the exterior surface of the adjusting member 17. A spring 26 shown retained within a groove 28 of the sleeve 11 is looped around the sleeve and has its ends extending through an opening 29 in the engaging member 22, the spring 26 thus tending to rotate the engaging member 22 about an axis of rotation 27 and maintain its engaging edge 25 out of contact with the exterior surface of the adjusting member 17. A portion 33 struck out of the plane of the bracket plate 8 may form an abutment or shoulder 34 for limiting the extent of rotation of the member 22 about the axis 27.

If desired an engaging member having a shape such as shown in Fig. 6 may be utilized, a slotted washer member 30 being fitted over a reduced portion of the sleeve 11a to provide an anchor for the spring 26a.

In operation when it is desired to apply the brake the handle 5 is pulled outwardly, thus moving the adjusting means 17 outwardly with respect to the mounting bracket 7. When these parts have been pulled outwardly sufficiently far to place the braking surfaces in gripping relationship of desired tightness the handle 5 and adjustment means 17 are moved laterally toward the adjacent edge 25 of the engaging or locking member 22 to place the edge 25 between the two adjacent ridges or corrugations on the adjusting means 17. With the parts in this relationship the handle 5 and cable 1 are allowed to move back or retract slightly toward the bracket 7, under the influence of usual brake rod or brake mechanism springs; this movement serves to turn the engaging member 22 about its axis 27 and the inner surface of the plate member 8 comes into contact with and rests against the plate member 8 (Fig. 5). It will be clear that the effective length outwardly extending leg portion of the engaging member 22 is such that as the engaging member turns about its axis 27, the engaging edge 25 moves into the interior of the sleeve member 11, the distance of this inward projection is such as to maintain the free edge 25 intermediate the two ridges or corrugations which were moved into contact with the free edge 25 upon the described transverse or lateral movement of the handle 5. Pulling force exerted by the brake mechanism and tending to release it is applied along the cable 1, to the handle stem 14 and thence along the adjusting means 17 to the engaging member 22 carried by the bracket 7; as the bracket 7 is fixed to the automobile the pulling force is thus transferred thereto.

To release the hand brake the handle 5 may be pulled outwardly slightly away from the mounting bracket 7, this movement serving to rotate the engaging member 22 and move its free edge 25 away from the sleeve 11. When the handle 5 and its connected adjusting member 17 has moved outwardly a sufficient distance, the free edge 25 is released from the cooperating engaging ridges of the adjusting member 17 and the engaging-member-spring 26 serves to snap the free edge 25 away from the adjusting member 17. When the free edge 25 of the engaging member 22 has thus been rotated free from engagement with the adjusting portion 17, the handle 5 may be allowed to move straight forwardly through the sleeve 11 to completely release the braking mechanism.

The rotatable construction provided by the collar 3 and the cable connection 6 further facilitates adjustment or release of the present device. When the handle 5 is rotated about the axis of its stem 14 the adjusting member 17 correspondingly rotates and moves along the engaging edge 25 similarly to a threaded rod travelling on a nut. Turning the handle 5 in one direction thus serves to increase the tension on the cable 1 and further tighten a brake mechanism, and turning the handle in an opposite direction decreases the tension and tends to release a brake mechanism.

Other forms of the adjusting member 17 may be employed but one formed by winding a steel wire into the tubular formation shown in the drawings is highly effective since the numerous grooves or interstices provide for numerous positions of adjustment of the member 17, and also provide a member which is readily movable or bendable laterally, and is of an optimum flexibility.

While the present device has been shown in substantially horizontal position with the engaging member 22 positioned at the upper part of the device and the supporting lip 31 at the lower part thereof, it will be clear that it may be mounted in any desired position. For example, it may be inverted so that the positions of the engaging member and lip 31 are reversed, or the device may be mounted vertically or at any intermediate angle. While the supporting lip 31 is desirable and provides for enhanced operation of the device it is not absolutely necessary and may be omitted. In addition, the device may be utilized with only a single adjusting member 17 although the use of an interior member 19 has been found to provide a sturdier and longer lasting construction.

In Fig. 7 there is shown a modified form of the present invention wherein a cable or rod member 1 is omitted and the outer member 17a, or both the inner and outer members, are made sufficiently long for direct connection with a mechanism which is to be operated. A hook 35 or any other suitable means may be provided at the free end of the extended adjusting member for connection with the part to be operated. In this form of the invention the tension or normal "pulling together" effect of the spring is preferably greater than the force required to securely clamp the brake surface; thus if greater brake applying force than necessary is applied to an operating handle in order to engage the brake mechanism the spring-like member 17a momentarily stretches and thus provides for smoother application of the brakes. The device of this modified form operates similarly to the preferred embodiment previously described.

It will be seen that the present invention provides a new and improved adjusting or controlling device which may be utilized to lock, unlock, or adjust to suitable positions any of numerous mechanisms or parts, e. g. parking brake mechanism of automobiles. The device is simple in construction and may be readily installed. While useful in automobiles of any size its construction and features make it particularly advantageous for use with small or bantam sizes of automobiles. The device may be readily and easily operated by inexperienced persons.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a brake controlling device, means for supporting a longitudinally movable adjusting means, a laterally flexible longitudinally movable adjusting means supported by said supporting means including a helical spring forming an exterior surface portion, and means selectively engageable with said helical spring at locations lengthwise thereof.

2. In a device of the class described, the combination of bracket means for supporting an adjusting means, adjusting means having a handle portion thereon and having a helical-like outer surface portion and normally supported by said supporting means and rotatable about a longitudinal axis thereof, and retaining means movable into and out of engagement with said adjusting means for retaining a desired position thereof.

3. In a device of the class described, the combination of a member adapted to be connected at one end with means to be actuated, laterally movable means surrounding said connecting member for a portion of the length adjacent the opposite end thereof and having a substantially corrugated surface, said member with said surrounding means being sufficiently rigid to maintain itself in a generally horizontal position, and a retaining member normally out of engagement with said corrugated surface and engageable therewith upon lateral movement of said laterally movable means into contact with the retaining member.

4. In a device of the class described, the combination of a central member adapted to be connected with a member to be actuated, laterally flexible inner and outer helical spring-like members shorter of length than said central member surrounding said central member for a portion of the length thereof, a holding member normally out of engagement with the outer surface of an outermost of said spring-like members and engageable therewith upon lateral flexing of said spring-like members and contact of an outermost spring-like member with said holding member, and yieldable means urging said holding member toward an out of engagement position.

5. In a device of the class described, the combination of an inner member adapted to be connected with a member to be actuated, oppositely wound laterally flexible inner and outer helical spring members surrounding said inner member, for a portion of the length thereof, adjacent coils of said outer helical spring member being separable from each other, a handle connected with said outer spring member adjacent an end thereof, and a holding member normally out of engagement with an outer surface of an outermost of said spring members and engageable between adjacent coils thereof upon lateral flexing of said spring-like members and contact of an outermost spring member with said holding member.

6. In a device of the class described, means for supporting a longitudinally movable adjusting means, laterally flexible longitudinally movable adjusting means supported by said supporting means and having sufficient stiffness to maintain itself in a generally horizontal position and including a generally transversely corrugated exterior surface portion, and retaining means including a laterally movable portion projectable between and spreading adjoining peaks of said transversely corrugated exterior surface portion of the adjusting means when in retaining engagement therewith.

BURTON L. HAVER.

REFERENCES CITED

The following references are of record in the file of this patent:

UNITED STATES PATENTS

| Number | Name | Date |
|---|---|---|
| 670,129 | Combs | Mar. 19, 1901 |
| 1,243,107 | Richardson | Oct. 16, 1917 |
| 1,899,477 | Phelps | Feb. 28, 1933 |
| 2,127,125 | Lorentzen | Aug. 16, 1938 |
| 2,243,910 | Laborda | June 3, 1941 |

FOREIGN PATENTS

| Number | Country | Date |
|---|---|---|
| 663,579 | Germany | Aug. 9, 1938 |